Feb. 1, 1938.  E. G. ROEHM  2,107,063
PATTERN CONTROLLED MILLING MACHINE
Filed April 14, 1937   6 Sheets-Sheet 2
Fig. 2
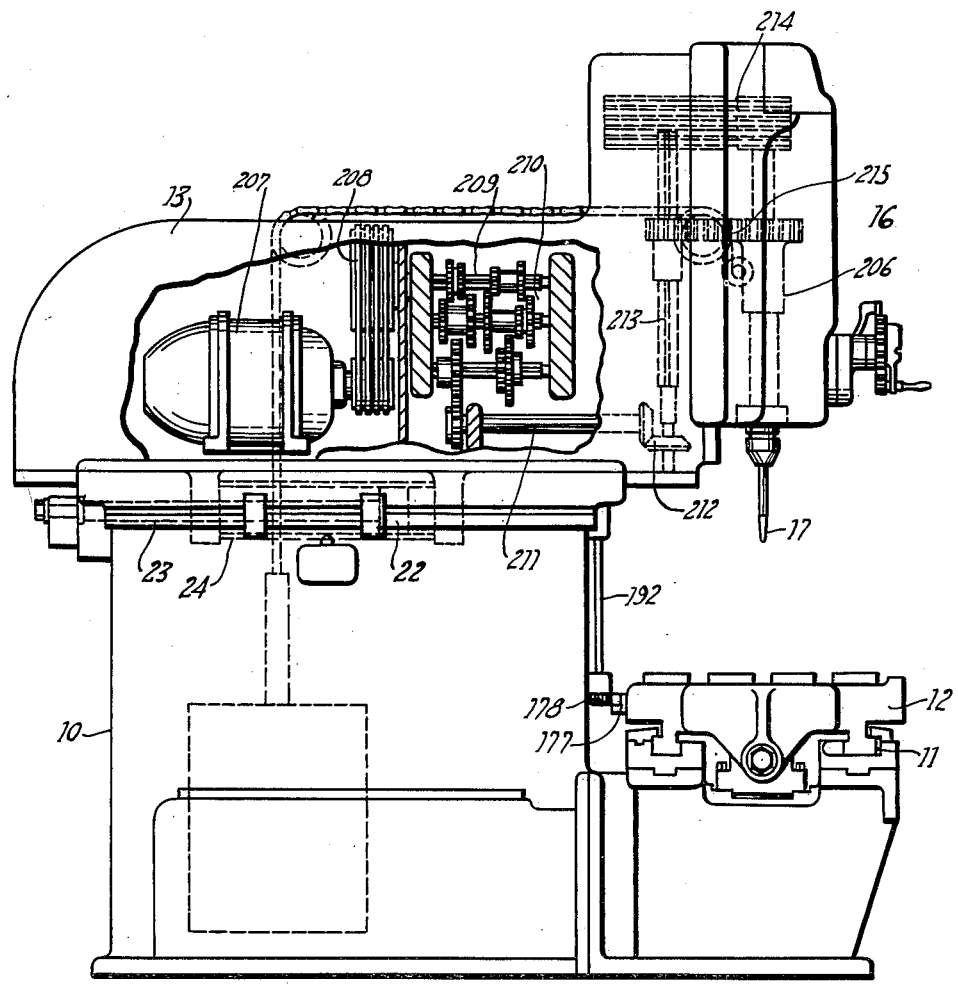
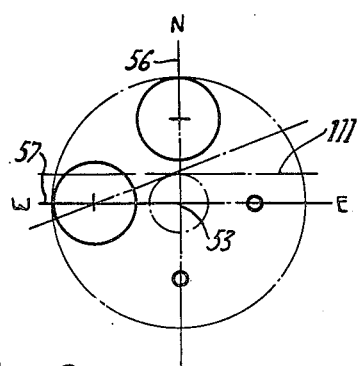
Fig. 8
INVENTOR.
ERWIN G. ROEHM
BY
ATTORNEY.

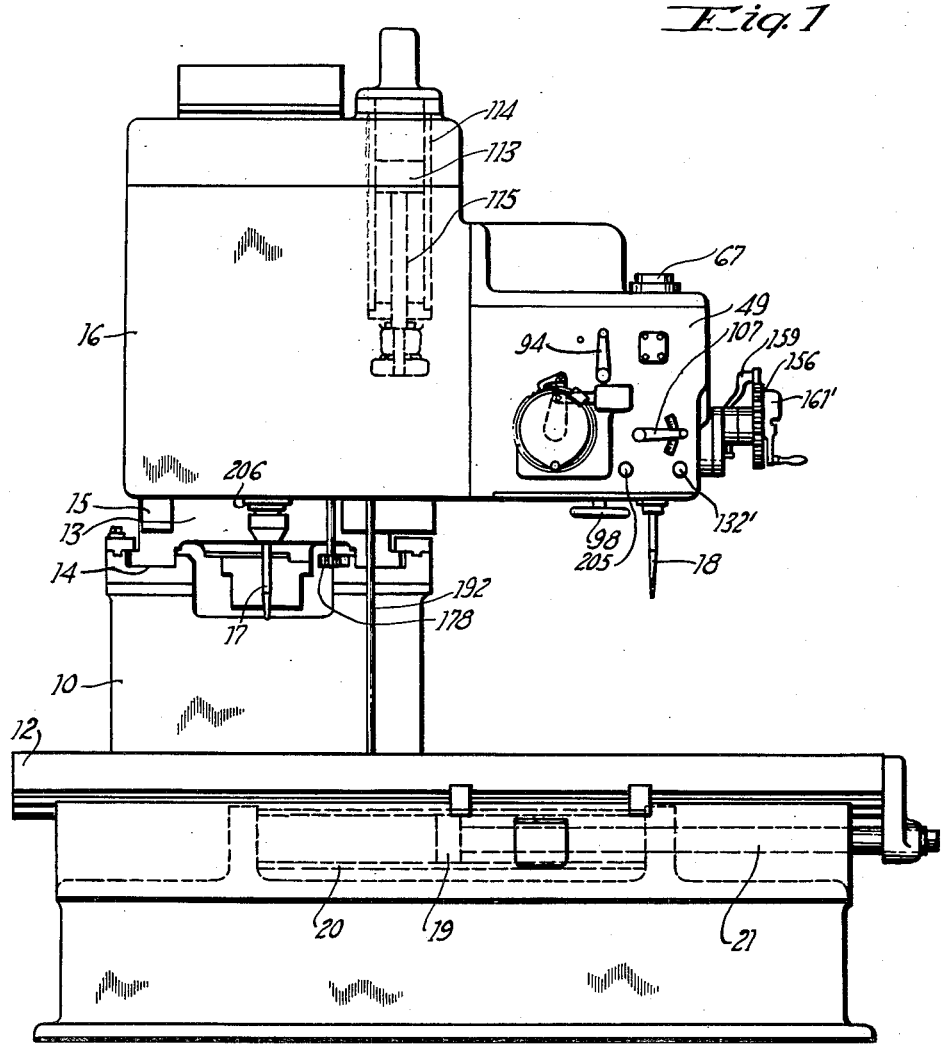
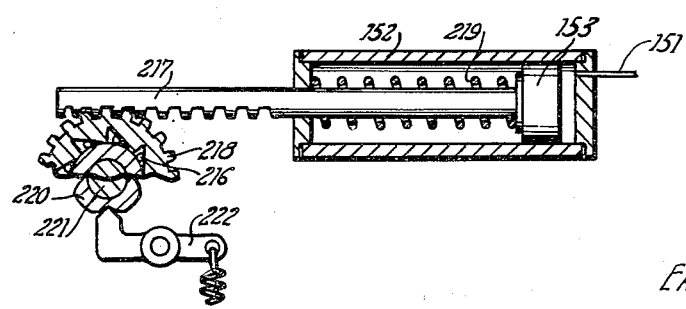

Feb. 1, 1938. E. G. ROEHM 2,107,063
PATTERN CONTROLLED MILLING MACHINE
Filed April 14, 1937 6 Sheets-Sheet 3

INVENTOR.
ERWIN G. ROEHM
BY
A. H. Parsons
ATTORNEY.

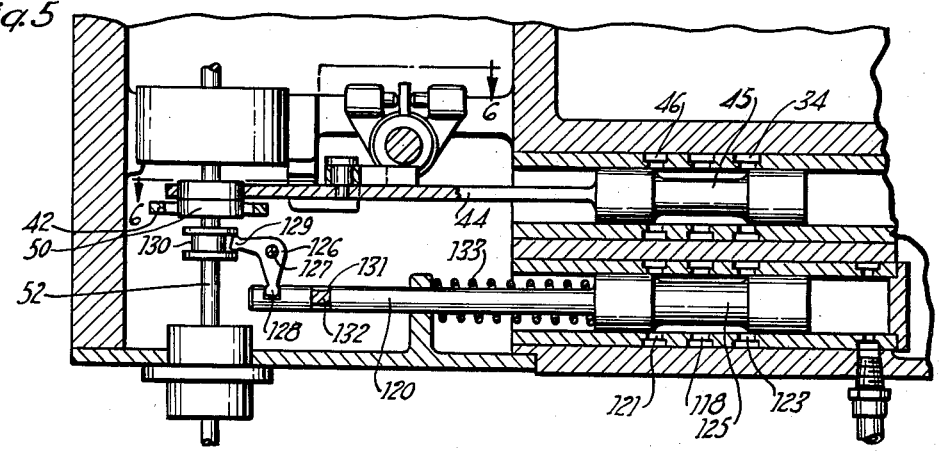
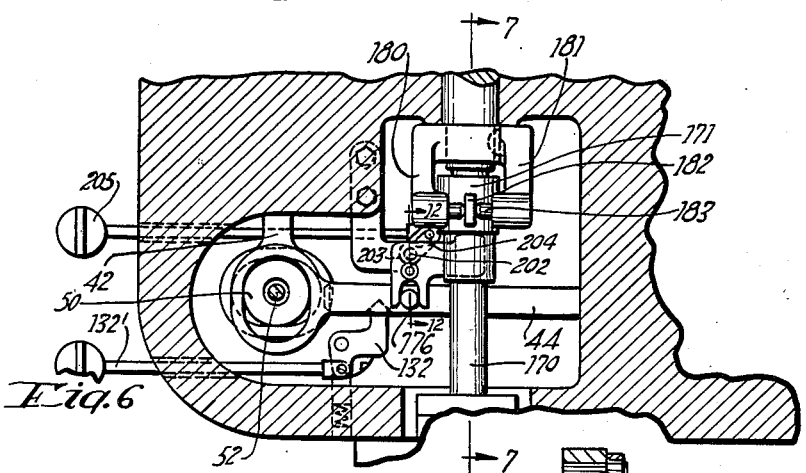
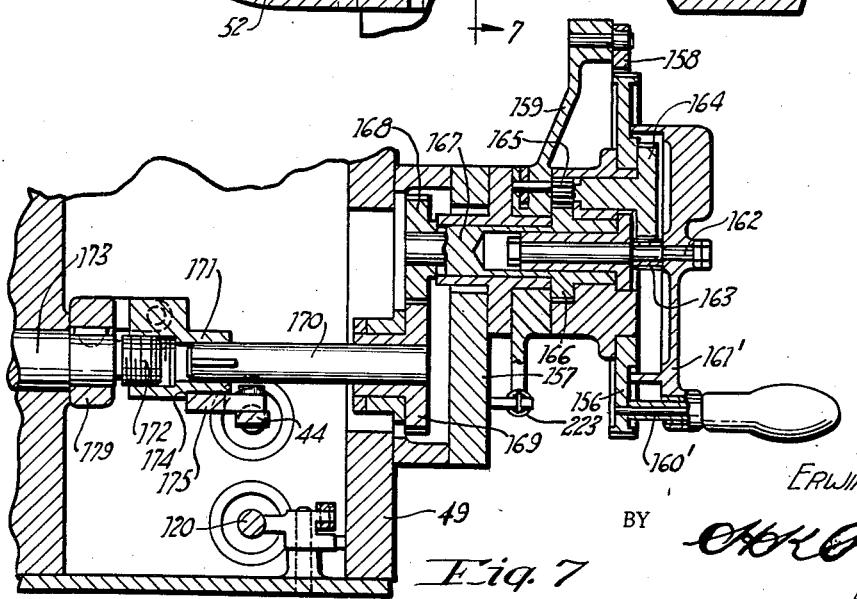

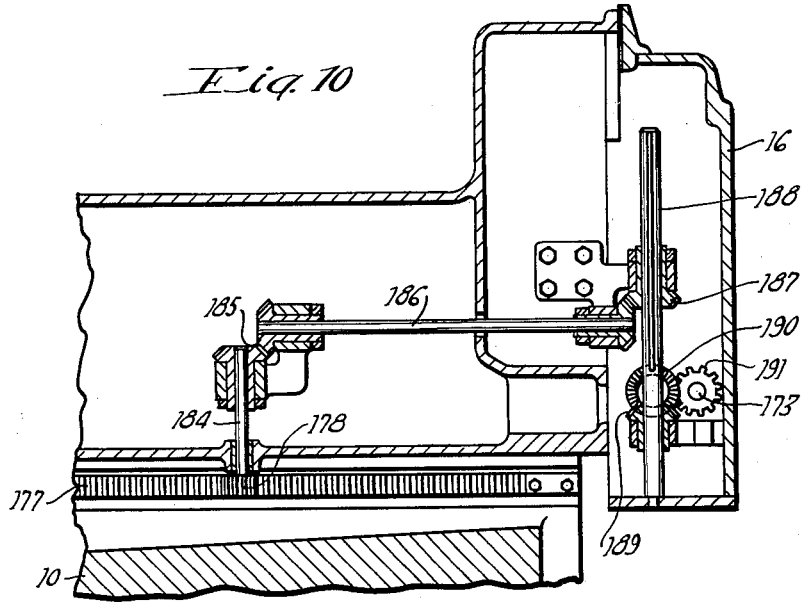
Fig. 10
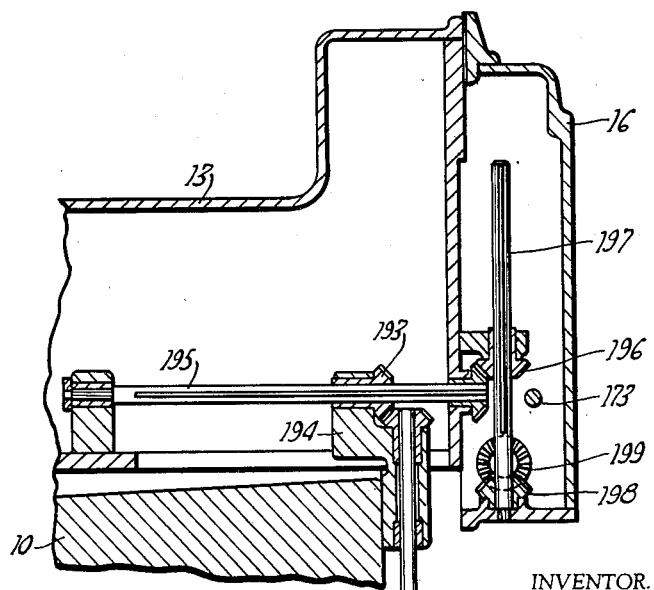
Fig. 12
Fig. 11
INVENTOR.
ERWIN G. ROEHM
BY
AHKParsons
ATTORNEY.

Patented Feb. 1, 1938

2,107,063

UNITED STATES PATENT OFFICE 2,107,063

PATTERN CONTROLLED MILLING MACHINE

Erwin G. Roehm, Norwood, Ohio, assignor to The Cincinnati Milling Machine Co., Cincinnati, Ohio, a corporation of Ohio Application April 14, 1937, Serial No. 136,844

22 Claims. (Cl. 90—13.5)

This invention relates to milling machines and more particularly to a novel and improved automatic pattern controlled milling machine.

It is an object of the present invention to devise an automatic pattern controlled milling machine in which the tracer will anticipate or precede the cutter and to accomplish this result with a simple and inexpensive control mechanism.

Another object of this invention is to provide an automatic pattern controlled milling machine with a tracer mechanism in which the tracer is normally deflected at all times, whether in contact with the pattern or not, so that the necessary anticipation with respect to the cutter is always present.

A further object of this invention is to provide an automatic control mechanism for a pattern controlled milling machine in which the amount of anticipation of the tracer with respect to the cutter will vary in accordance with the feed rate.

A still further object of this invention is to provide a tracer mechanism for an automatic pattern controlled milling machine in which the tracer directly controls the direction of feed.

An additional object of this invention is to provide a simple, novel mechanism which will normally maintain an artificial deflection of the tracer at all times and yet maintain a continuous urge of the tracer into contact with the pattern.

Another object of this invention is to provide an artificial deflecting means for the tracer which is unidirectional but which is so constructed that the entire mechanism may be automatically adjusted throughout an angle of 360° so that the direction of the unidirectional urge may be oriented to any point of the compass.

An additional object of this invention is to provide in an automatic pattern controlled milling machine a simple and improved cycle selective mechanism whereby the machine may be utilized for either profiling or die-sinking purposes.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine tool embodying the principles of this invention.

Figure 2 is a side elevation of the machine shown in Figure 1 and is viewed from the left side of that figure.

Figure 5 is a section on the line 5—5 of Figure 3.

Figure 6 is a section on the line 6—6 of Figure 5.

Figure 7 is a section through one of the indexing mechanisms as viewed on the line 7—7 of Figure 6.

Figure 8 is a diagrammatic view showing the results effected for different positions of the control end of the tracer.

Figure 10 is a detail view showing the feedback connection from the cross slide.

Figure 11 is a detail view showing the feedback connections from the table.

Figure 12 is a detail section on the line 12—12 of Figure 6.

Figure 13 is a detailed view of the reversing valve actuating mechanism.

In conventional manual control profiling machines there is a rigid tracer which is fixed some predetermined distance from a cutter spindle and parallel therewith, so that it may be manually held in engagement with a pattern and thereby guide a cutter attached to the cutter spindle through a path corresponding to the outline of a pattern. When automatic machines for this purpose were developed, the tracer was made deflectable so that it might be utilized as a means for obtaining automatic control. In other words, during cutting, the tracer which was supported for universal movement about an intermediate point, assumed a normal working position, often referred to as a neutral position because at that time it exercised no control as respects change in the direction of the profiling linear feeding movement.

Movement of the tracer from this neutral position, resulting in a change in the angle of deflection of the tracer, caused a change in direction of feed whereby automatic control became possible. It thus becomes obvious that for automatic control, the tracer must be capable of movement in two directions from its neutral position in order to effect both clockwise and counterclockwise changes in the direction of the feeding movement. This means that the tracer must be held in some intermediate position and by two different means, one of which, of course, is the pattern, and the other, some form of means tending to urge the tracer into contact with the pattern, which, of course, must be resilient so that protuberances on the pattern will positively move the tracer in one direction, and depressions in the pattern will permit the resilient means to move the tracer in an opposite direction.

In existing automatic machines, when the tracer is out of contact with the pattern, said resilient means will act to straighten the tracer, that is, to move it into co-axial relation with the axis of the tracer head, which means that when the feeding movement starts, the tracer has no anticipation over the cutter, and furthermore, after contact with the pattern, and after the tracer is laterally deflected by the edge of the pattern as in profiling, the tracer has no anticipation over the cutter in the direction of feed. This results in inaccuracies, and it is highly desirable, therefore, that the tracer have some anticipation over the cutter so that when sharp corners are met in a profile, the tracer will have sufficient time to react on the control circuit, and thereby change the direction of movement of the cutter before it overruns the desired outline.

Figure 3:
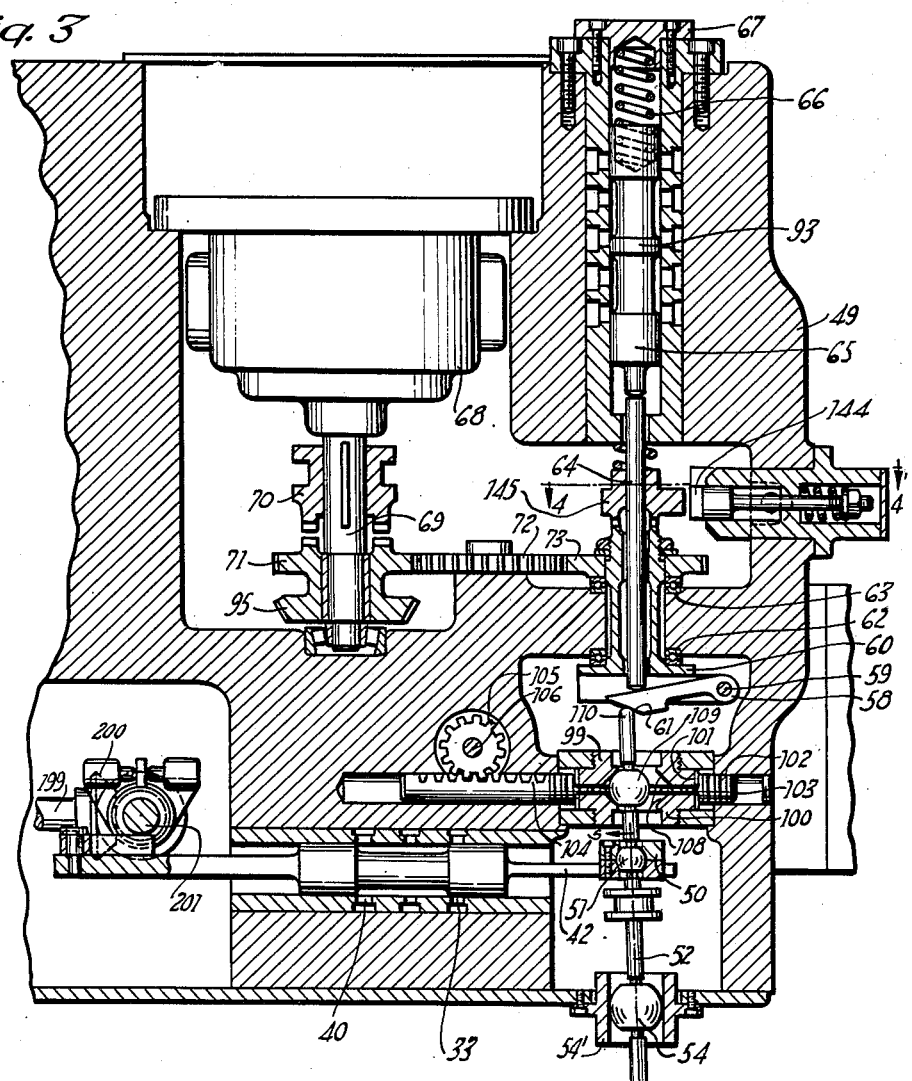
Figure 3 is a section on the line 3—3 of Figure 1 showing the details of the tracer control mechanism.

A novel tracer control mechanism for accomplishing these desired results is shown in Figure 3 of the drawings and may be incorporated in a machine of the type shown in Figures 1 and 2 in which the reference numeral 10 indicates the bed of the machine having guide ways 11 formed on one portion thereof for receiving and supporting a table 12 upon which a pattern and work piece may be mounted. A second slide 13 is supported in guide ways 14 for movement transversely over the work table 12. The slide 14 also has guide ways 15 upon which is mounted a vertically movable slide 16 which carries the tracer control mechanism.

By means of these three slides the cutter 17 and the tracer arm 18 may be moved in three different directions relative to the pattern and work.

The work table 12 is moved by a piston 19 contained in a cylinder 20, and the piston is of a differential type, being connected at one end by a piston rod 21 to the table 12. Similarly, the slide 13 is actuated by a piston 22 of the differential type which is connected by a piston rod 23 to the bed 10. The piston 22 is contained in a cylinder 24 which depends from the underside of the slide 13, whereby the cylinder actually moves and the piston is fixed.

During profiling, the tracer controls the actuation of these pistons in the following manner.

Figure 9:
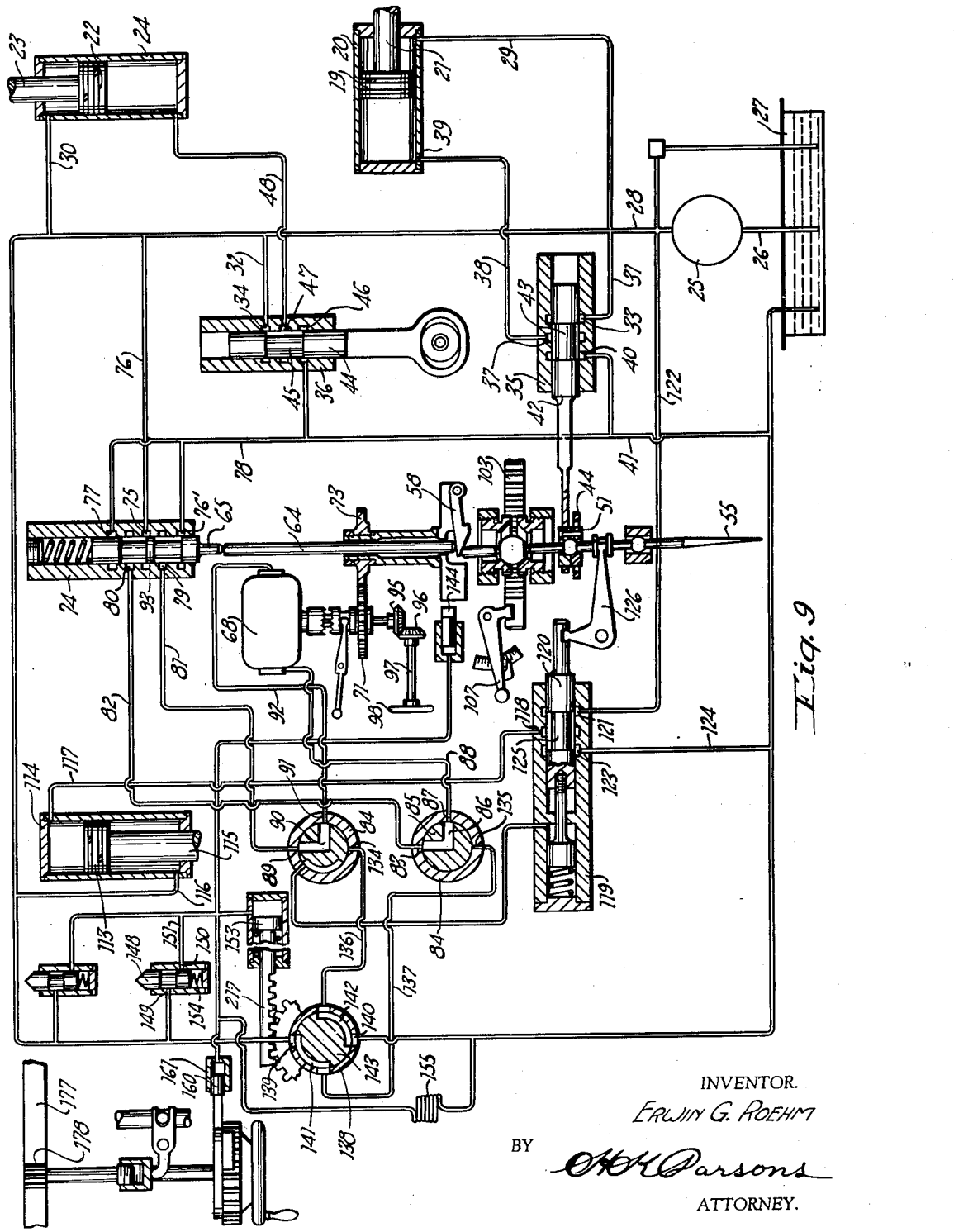
Figure 9 is a diagram of the entire hydraulic control circuit for the machine.

The cylinders 20 and 24 are both supplied with operating fluid from a constant displacement pump 25, as shown in Figure 9, which pump has an intake 26 through which fluid is withdrawn from a reservoir 27, and a delivery channel 28, which has branches 29 and 30 leading to one end respectively of cylinders 20 and 24. This channel also has branches 31 and 32 leading to pressure ports 33 and 34 respectively of control valves 35 and 36. The valve 35 controls the reversible operation of the piston 19 and has a central port 37 which is connected by channel 38 to port 39 of cylinder 20 for supplying fluid to the large end of piston 19. The valve 35 also has an exhaust port 40 which is connected to a reservoir line 41. The valve plunger 42 of valve 35 has an annular groove 43 which is of such length that when the plunger is in a central or neutral position, ports 33 and 40 are only half open and the port 33 will have sufficient resistance to cause the pump pressure in line 31 to drop one-half of its pressure, thereby causing the unit pressure in the left hand end of cylinder 20 to be equal to one-half of the pressure in the other end of the cylinder which is equal to pump pressure, because directly connected by branch 29 to the main pump supply channel 28.

Since the piston 19 is of the differential area type, if the total area of the small side is equal to one-half of the total area of the large side, it will be apparent that the total resultant pressures acting on opposite sides of the piston 19 are equal and no movement will result. The action of the valve plunger 42 may be explained in another way in that if the resistance of port 33 to flow into the annular groove 43 is equal to the resistance of port 40 to flow out of the annular groove the pressure of the fluid in the annular groove will be equal to one-half of the incoming pressure because it is a well-known hydraulic law that if the resistance to flow into a chamber is equal to the resistance to flow out of the chamber that the pressure in the chamber is equal to one-half of the supplying pressure.

It will now be evident that if the valve plunger 42 is moved to the right, as viewed in Figure 9, that there will be a rise in pressure in the annular groove 43 due to decrease of the resistance of port 33 and increase in the resistance of port 40, whereby the total resultant pressure acting on the left hand end of piston 19 will be greater than the total resultant pressure acting on the other end and the piston 19 will move to the right.

On the contrary, if the valve plunger 42 is moved to the left of its central position the change in resistances of ports 33 and 40 will be inverse, thereby causing a drop in pressure in the annular groove 43 and causing the piston 19 to move toward the left.

Similarly, the valve 36 controls movement of cylinder 24 in the same manner as valve 35 controls the movement of piston 19. It has a valve plunger 44 in which is formed an annular groove 45 of sufficient length to interconnect pressure port 34 to exhaust port 46 when in a central position. This valve also has a port 47 which is connected by channel 48 to one end of cylinder 24. When the valve plunger is in a central position the resistance of port 34 to flow into the annular groove is equal to the resistance of port 46 to flow out of the annular groove, whereby the total resultant pressure acting on the large end of piston 22 is equal to the total resultant pressure acting on the small end and no movement of slide 13 takes place.

The valves 35 and 36 are supported in the bracket 49 which is attached to the vertical slide 16, as shown in Figure 1, and are arranged therein at right angles, as shown by the position of the valve plungers 42 and 44 in Figure 6. These valve plungers have slotted yoke connections arranged at right angles whereby either valve may be moved axially without causing movement of the other. As shown in Figure 3, a divided collar 50 is attached to the ball-shaped member 51 carried by the tracer arm 52. This forms a sort of universal joint whereby the tracer arm may move at an angle relative to the axis of the collar, or in other words, so that the collar may remain perpendicular to the plane of the valve rods 42 and 44. The yoke connections between the valve rods and the collar are carefully made so as to eliminate any lost motion between the parts.

Referring now to Figure 8, the numeral 53 indicates on the diagram the axis of the tracer head, as well as the axis of the tracer arm when the same is in a vertical position. If now, the tracer is deflected, the ball portion 51 on the tracer will move radially from the axis 53. Due to its connections with the control valves of the slides 12 and 13 the orientation of the radial path of movement of the ball portion 51 relative to the axis 53 will indicate the direction of resultant movement effected by the two slides. The tracer arm 52 has a second ball-shaped portion 54 which is confined in the tubular bracket 54', and the center of this portion forms the center for the universal tilting movement of the tracer arm. Since the connection between the tracer arm 52 and the slide control valves is above this center, it will be apparent that the tracing end 55 of the tracer will move in an opposite radial direction to the pivotal connection 51. In other words, if the axis 56, shown in Figure 8, is parallel to the direction of movement of slide 13, and the axis 57 parallel to the direction of movement of slide 12 and the tracing end of the tracer 55 is moved radially along the axis 56 toward the south, the control valve 36 will be moved in such a direction as to cause the slide 13 to move south as viewed in Figure 8.

Likewise, if the tracer is deflected north from the axis 53, the slide 13 will move toward the north. The valve 37 is also so connected to the tracer that when the end 55 of the tracer arm is deflected to the east, the slide 12 will move toward the west, and, vice versa, when the tracer is moved toward the west the slide 12 will move toward the east. It will be noted that all of these movements take place in such a direction that the tracer is always in advance of the center 53 and if that center is now considered as the axis of the cutter, then the tracer always reaches a given portion of the pattern slightly in advance of the cutter reaching a certain corresponding portion on the work.

In order that the tracer may have this anticipation relative to the cutter, there has been provided artificial means for deflecting the tracer in a predetermined direction in accordance with the direction of feed. In other words, the tracer is predeflected. The means for accomplishing this predeflection comprises a lever 58, Figure 3, which is pivotally supported at 59 on the rotatable head 60. The end of the lever 58 has a bevel face 61 which engages the upper end of the tracer arm. The head 60 is supported for rotation on anti-friction bearings 62 and 63 carried by the bracket 49. A slidable rod 64 is mounted for axial movement through the center of the rotatable head and the lower end of this rod engages the upper side of the lever 58. The upper end of this rod is in contact with the lower end of a valve plunger 65. A spring 66 is interposed between a cap 67 fastened to the top of the bracket 49 and the upper end of the valve plunger 65 whereby the spring 66 exerts a downward force on the rod 64, causing rotation of the lever 58 about its pivot 59 and thereby through its beveled end 61 causing deflection of the tracer arm 52. From this it will be noted that the direction of deflection of the tracer when the same is free depends upon the orientation of the lever 58 relative to the axis of rotation 53 of the head 60.

The valve plunger 65 functions to control the direction of rotation of an hydraulic motor 68, which has a driven shaft 69 to which is keyed a slideable clutch member 70. This shaft also supports for free rotation a spur gear 71 which is connected through an intermediate idler 72 to a spur gear 73 integral with the rotatable head 60. As shown in the diagram in Figure 9, the control valve 74 for the motor 68 has a pressure port 75 which receives fluid through channel 76 from pump 25. This valve also has a pair of exhaust ports 76' and 77 which are connected by channel 78 to reservoir.

On opposite sides of the pressure port 75 are a pair of ports 79 and 80 which have channels 81 and 82 connected respectively thereto for alternately delivering pressure to the motor 68 to cause opposite directions of rotation thereof. For control purposes, the channel 82 is connected to port 83 of a control valve 84 which has a rotatable plunger 85 in which is formed an L-shaped passage 86 for connecting port 83 to a second port 87. This last-named port has a channel 88 connected thereto which leads to one side of the pump 68.

The channel 81 is connected to a port 89 of control valve 84 and a second L-shaped passage 90 connects port 89 to port 91. The port 91 is connected by a channel 92 to the opposite side of motor 68. When the valve plunger 85 of the control valve 84 is in the position shown in Figure 9, then the control valve 74 is capable of controlling reversible operation of the motor 68. In other words, when the valve plunger 65 is in its central position, the spool 93 substantially closes the pressure port 75 so that the pressures existing in channels 88 and 92 will be equal and no rotation of motor 68 will occur. From this it will be obvious that if the plunger 65 is moved to either side of this central position that fluid pressure will be delivered to one of the channels 81 and 82 and the other of these two channels will be connected to the return line 78.

The function of the hydraulic motor 68 is to rotate the head 60 in order to change the direction of thrust on the upper end of the tracer arm 52 by the lever 58. It will be obvious that in going around a profile, or through any closed path, the head 60 must be rotated through an angle of 360° in order to continuously maintain the tracer slightly in advance of the cutter. Therefore, as the tracer operates to change the direction of feeding movement, it must also operate to change the direction of urge of the lever 58. It will be apparent that when a linear profile is being scanned that no rotation should occur in the motor 68 and therefore the valve plunger 65 should be held in a central position. It should, however, be capable of movement to either side of this position in order to cause reversible rotation of the motor. It is believed that the operation of the parts will be better understood by describing the manner in which automatic contact between the tracer and pattern is established for profiling operations and the subsequent changes effected after the contact has been established. As previously described, the motor 68 is connected to the spur gear 71 by the slideable clutch member 70 which is controlled by the manually operable lever 94 mounted on the front of the machine as shown in Figure 1. If this clutch is now disengaged, no rotation of the tracer head will occur, regardless of the position of the control valve 65. The operator, however, can manually position the head 60 in order to cause deflection of the tracer in any desired vertical plane and since the plane of deflection of the tracer determines the direction in which the feed will take place it will be apparent that the operator can set the machine to determine the direction in which the tracer will move into contact with the pattern. To this end, the spur gear 71, shown in Figure 3, has integrally formed therewith a bevel gear 95 which intermeshes with a bevel gear 96 secured to a shaft 97, to the end of which is attached the manually operable hand wheel 98 as shown in Figure 1 of the drawings.

Having rotated the head 60 so as to deflect the tracer arm 52 in the desired plane and with the tracing end 55 slightly in advance of the cutter, the pump 25 is started, which will cause a relative approaching movement between the pattern on the table 12 and the tracer.

When the contact is established between the tracer and pattern the operator shifts the clutch 70 so as to connect the motor for rotation of the tracer head. The amount of deflection of the tracer by the lever 58 is limited by a pair of threaded members 99 and 100 which have gear teeth 101 formed on their periphery and interengaging with rack teeth 102 formed on a longitudinally movable rack bar 103. This rack bar has another set of rack teeth 104 formed thereon which are engaged by a pinion 105 secured to shaft 106. This shaft projects to the front of the bracket 49 and is there provided with a manually operable lever 107. By rotating this lever the members 99 and 100 may be caused to approach or recede from one another. Conically-shaped recesses 108 are formed in the abutting faces of the members 99 and 100 but co-axial therewith.

A ball-shaped portion 109 formed on the tracer 52 is located between these conical-shaped depressions for the purpose of limiting the amount of tracer deflection. In other words, the tracer is predeflected before it contacts the pattern and the depressions limit the amount of this predeflection, and therefore, it cannot be given additional deflection by the pattern. In its predeflected state it resembles a wabble-disk which has its true axis inclined to its axis of rotation. When the tracer contacts the pattern while in a predeflected condition, it is caused to rotate about a vertical axis which is co-axial with the axis of the tracer head 60 and which passes through the center of the ball-shaped portion 54.

In other words, the amount of deflection of the tracer remains the same but the ball-shaped portion 109 will travel a circuitous path, the radius of which is defined by the amount of separation of the conical-shaped depressions 99 and 100.

In spite of this circuitous movement, the upper end 110 of the tracer arm will nevertheless move closer to the pivot 59. This approaching movement will cause the lever 58 to move upward and thereby cause upward movement of the valve plunger 65. The intermediate rod 64 is made of such length that when the tracer is out of contact with the pattern the valve plunger 65 is below its center position which will thereby cause rotation of the motor 68 and connected tracer head 60, but as the tracer swings about its wabble axis in the manner just described, the valve plunger 65 will be moved upward, thereby gradually closing the pressure supply port and slowing down the rate of rotation of the motor.

Another effect simultaneously produced by the tracer as it swings about its wabble axis is to change the direction of the feeding movement due to the direct connection of the tracer arm with the slide control valves 35 and 36. When the tracer is predeflected, it will normally cause continuous rotation of the tracer head, and simultaneously, a continuous change in the direction of feed. It is desirable, however, that the direction of feed remain constant in order to accomplish engagement of the tracer with the pattern, and to this end, the clutch 70 was provided so that the motor 68 may be disconnected from the tracer head during the approaching movement of the tracer toward the pattern. At the moment of contact between the tracer and pattern, the operator manually throws the clutch 70 into engagement with the spur gear 71 whereby the head 60 will begin to rotate.

Since the pivot 59 is integral with the head 60 it will move therewith, and thereby change the orientation of the lever 58 relative to the north and south axes 56 and 57 which are shown in Figure 8. In addition, the imaginary line 111 will also move, since it is at all times parallel to the axis 59. If it is assumed that the edge of the pattern runs parallel to the east-west axis 57 and that the direction of feed is toward the west then the tracer will rotate in a clockwise direction until the end 110 of the tracer lies on the intersection of the imaginary line 111 and the east-west axis 57. It will be apparent that when this occurs that the direction of feed is toward the west because the plane of the tracer lies in the plane of the axis 57 and also that no rotation of the tracer head will occur to change this direction because the end of the tracer now lies on the imaginary line 111 which indicates the neutral position of the tracer valve 65.

With the parts in this position, as just described, it is important to note that the lever 58 does not lie parallel to the east-west axis 57, but at an angle thereto, which means that it is exerting a force on the upper end of the tracer of such a nature as to cause the tracer to swing in a counterclockwise direction, but this movement is prevented by the pattern, and it is, therefore, this urge that maintains the tracer in contact with the pattern and serves as the resilient force which will cause the tracer to enter depressions in the profile of the pattern while the protuberances on the pattern act as positive means to swing the tracer in a counterclockwise direction. Thus, automatic control is obtained and at the same time a certain amount of anticipation over the cutter is always present.

It will be noted that when the rate control elements 99 and 100 have their greatest separation that the tracer has its greatest amount of predeflection and at this time the feed rate is the greatest. Therefore, the amount of predeflection varies in accordance with variations in the feed rate.

Disengagement of the tracer and cutter from the pattern and work respectively is effected by disengaging the clutch 70 and rotating the hand wheel 98 until the direction of feed is pointed in a direction away from the pattern and work.

For die-sinking operations it is more convenient to use the vertically movable slide 16 in conjunction with the table 12, whereby during a stroke of the table the cutter 17 will be moved up and down under control of the tracer 18 in contact with the pattern. At the end of a given stroke of the table the cross slide 13 may be indexed some predetermined amount in accordance with the nature of the work and the finish desired.

The vertical slide 16 is moved by a piston 113 contained in a cylinder 114. The piston 113 is connected by a piston rod 115 to the slide 16 and the cylinder 114 is connected to the cross slide 13. The lower end of the cylinder is connected by a channel 116 to the main pressure line 28 and the upper end of the cylinder is connected by a channel 117 to port 118 of a control valve 119. It will be noted that the piston 113 is of the differential type and that the small end of the piston is subjected to the full pump pressure in channel 28, and the upper end of the piston is connected to the valve 119 whereby the control plunger 120 may reduce the pressure in the same manner as the previous slide control valves. In other words, the valve 119 has a port 121, which is connected by branch line 122 to the main supply channel 28 and a second port 123 which is connected by branch line 124 to reservoir. The annular groove 125 formed in the valve plunger 120 is of such length that it will partially close ports 121 and 123 an equal amount so as to create a drop in pressure in accordance with the direction of flow, whereby the pressure in groove 125 will be equal to one-half of the pump pressure when the plunger 120 is in its central position.

The valve plunger 120, Figure 5, is connected by a bell crank 126 to the tracer arm 52. This bell crank is pivoted at 127 and has a ball-ended lever 128 which interfits in a slot formed in the end of plunger 120. The other arm 129 of the bell crank fits into an annular groove 130 formed on the tracer arm 52. The plunger 120 has a notch 131 formed in the side thereof into which fits a pivoted stop lever 132 which holds the bell crank and valve plunger 120 in a central position. When the stop is withdrawn by pulling the lever 132', a spring 133 acting on plunger 120 axially shifts the same and causes a certain amount of downward movement of the tracer arm 52. The result is a change in the resistance at port 121 which causes an increase in the pressure in the upper end of cylinder 114 and downward movement of the slide 16.

Since the upward and downward movement of the tracer 52 is now utilized to control the vertical movement of the slide 16, the control valve 74 for the hydraulic motor 68 is disconnected from the motor by rotating the plunger of valve 84 through an angle of 90° and in a clockwise direction, as viewed in Figure 9. This results in the motor port 91 of the valve being connected by the groove 90 to port 134, and the other motor port 87 being connected to port 135. These ports are connected by channels 136 and 137 to the reversing valve 138. Rotation of the hydraulic motor 68 is now under direct control of the reversing valve 138 which has a pressure port 139 and an exhaust port 140. A pair of grooves 141 and 142, formed in the plunger 143 of this valve, serve to alternately interconnect the motor lines with the pressure and reservoir lines to cause reversible operation of motor 68.

Figure 4:
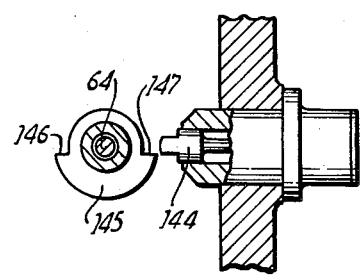
Figure 4 is a detail section on the line 4—4 of Figure 3.

The reversing valve 138 only has two positions which means that pressure is connected at all times to either channel 136 or 137 during a die-sinking operation and in order to prevent continuous rotation of the motor 68 and still have the same available for reversing the direction of feeding movement, an hydraulically actuated stop 144 has been provided, the details of which are more particularly shown in Figure 4. The tracer head 60 has integrally secured thereto a member 145 upon which is formed a pair of shoulders 146 and 147. When the plunger 144 is projected into the path of these shoulders it will be apparent that the head 60 can only be rotated through an angle of 180°. This is sufficient, however, to move the tracer about its wabble axis through this same angle and thereby reverse the direction of feed by shifting the control valve 42. In other words, at the end of each stroke of the table, the reversing valve is actuated through an angle of 90°, thereby reversing the pressure on opposite ends of motor 68 and causing the same to rotate the tracer head through an angle of 180° which is sufficient to change the direction of hydraulic actuation of the slide 12. Actuation of the reversing valve is effected by a dog operated plunger 148 which is positioned adjacent slide 12 and provided with a pressure port 149 connected to the supply line 28, and a second port 150 which is connected by channel 151 to a cylinder 152 in which is slideably mounted a piston 153 which actuates the reversing valve plunger 143. A spring return ratchet mechanism, as shown in Figure 13, is utilized to interconnect the piston 153 for unidirectional rotation of the reversing valve plunger, the ratchet means 216 being so set that upon hydraulic actuation of the piston 153, the rack 217 will rotate pinion 218 and the valve will be rotated, and upon release of the pressure in the cylinder 152, the spring 219 will return the parts to their starting position. If desired, a detent wheel 220 may be secured to the shaft 221, and a spring pressed detent lever 222 provided for insuring accurate positioning of the valve and preventing return movement during return of the rack.

When the trip dog passes out of engagement with the trip plunger 148, the latter is returned by a spring 154 which disconnects channel 151 from the main pressure line 28. In order to permit the reversing valve actuating plunger 153 to return to its starting position, a bleeder coil 155 connects channel 151 to reservoir whereby the fluid trapped in these lines will slowly drain to reservoir and permit the spring attached to the ratchet mechanism to return plunger 153.

In die-sinking operations it is desirable that at the end of a given cutting stroke that a relative indexing movement be effected between the cutter and work so that new material will be removed on the return cutting stroke. It will be apparent that if the cutting stroke is being effected by moving the slide 12, then the indexing stroke will be effected by moving the cross slide 13, or vice versa, and, if the cutting stroke is being effected by movement of the slide 13, then the indexing stroke will be effected by moving the slide 12. Duplicate mechanisms are, therefore, provided for indexing each of these slides and since the mechanisms are the same only one will be described.

Referring to Figures 1 and 7, a feed wheel 156 is rotatably mounted on a bracket 157 carried by the housing 49, and the periphery of this wheel is serrated for engagement by a feed pawl 158 pivotally connected to a swinging arm 159. This swinging arm is operatively connected to hydraulically actuated piston 160 slideably mounted in a cylinder 161, which has one end connected to the line 151. Therefore, when the trip plunger 148 is depressed by a dog, and pressure is admitted to channel 151, the piston 160 actuates the feed pawl and rotates the feed wheel a predetermined amount. Upon release of pressure, a spring 223 may be provided for returning the swinging arm and gradually forcing the fluid in the cylinder through the bleeder 156.

The feed wheel 156 is connected by a pin 160' and plate 161' to a shaft 162 upon which is keyed a pinion 163. This pinion meshes with a planet gear 164 which has integral therewith a second pinion 165. This second pinion meshes with a spur gear 166 integral with a shaft 167, which has keyed to its end a spur gear 168. This gear rotates the gear 169 which is keyed to shaft 170. The shaft 170 has a sliding spline fit in a nut member 171. The nut member interengages the threaded end 172 of shaft 173. The nut member 171 has a shoulder 174, against which abuts one end of a bell crank lever 175, as more particularly shown in Figure 6.

The other end of this bell crank lever has a forked end which embraces a pin 176 integral with the plunger 44 of the control valve 36. When the shaft 170 is rotated by action of the feed pawl on the feed wheel, the nut member 171 is caused to rotate relative to the screw 172, and since the screw is fixed for the moment, the nut member 171 will travel toward the gear 169.

Since the shoulder 174 is abutting the end of the bell crank 175, this will cause rotation of the bell crank in a clockwise direction, as viewed in Figure 6, and thereby move the plunger 44 of the control valve 36. This will cause actuation of the slide connected thereto. A rack bar 177, Figure 10, is attached to the movable slide for movement therewith and a pinion 178 interengages this rack bar for rotation thereby in such a direction that it will rotate the screw 172 in a direction to cause the nut member 171 to return to its former position and thereby reposition the valve plunger 44 in a stop position. It will be apparent that this is a form of servo-control mechanism.

During a continuous feeding movement of the slide, it will be obvious that a continuous relative movement between the screw and nut cannot take place and therefore a lost motion connection has been provided comprising a collar 179 which is keyed to shaft 173 and which is provided with a pair of arms 180 and 181, which embrace a lug 182 integral with the nut member 174. The ends of the arms 180 and 181 support a pair of spring pressed plungers 183 which have a limited amount of axial movement whereby the servo-action may be effected, but upon continuous movement of the shaft 173, the nut 174 and connected mechanism will be rotated in unison.

Although the servo-control mechanism just described is the same for both slides, the specific manner of making the feed-back connections for the two slides is illustrated in Figures 10 and 11. In Figure 10, a shaft 184 supports the pinion 178 in operative engagement with the rack 177, which rack is carried by the bed 10. The shaft 184 is connected by bevel gearing 185, shaft 186 and bevel gearing 187 to a vertical spline shaft 188 which is journaled in the vertical movable carrier 16. The spline shaft 188 is connected by bevel gearing 189 to a horizontally extending shaft 190, which shaft is connected by spur gearing 191 to shaft 173, shown in Figure 7. This completes the feed-back connection for the horizontally movable slide 13.

In Figure 11 is shown the feed-back connections from the table, and, as shown in Figure 2, the table 12 carries a similar rack bar 177 which is engaged by a pinion 178 secured to the lower end of a vertical shaft 192. This shaft is connected by bevel gearing 193, which are supported by a bracket 194 fixed with the bed 10, to a horizontal spline shaft 195. This spline shaft is journaled for axial movement with the cross slide 13 and is movable relative to the bevel gearing 193. One end of shaft 195 is connected by bevel gearing 196 to a vertical spline shaft 197 which is supported for movement with the vertical slide 16. The lower end of this shaft is connected by bevel gearing 198 to a horizontal shaft 199, which shaft, as shown in Figure 3, is connected by bevel gearing 200 to the nut member 201, which corresponds to the nut member 172 of the construction shown in Figure 7. This completes the feed-back connection to the table control valve plunger 42.

When the machine is being utilized for other than die-sinking purposes the bell crank 175 may be withdrawn from engagement with the pin 176 so as to permit free actuation of the control valve plunger 44, or 42, as the case may be, by the tracer and to this end the bell crank 175 may be supported on an eccentric pin 202, as more particularly shown in Figure 12, so that by means of a crank arm 203 secured to the lower end of this pin it may be rotated in a direction to withdraw the bifurcated end of the bell crank out of engagement with the pin 176. For convenience of operation, a control lever 204 may be pivotally connected to the end of the crank arm 203 and projected through the outer wall of the machine so that it may be provided with a control knob 205.

The cutter 17 is supported in a spindle 206 which, as shown in Figure 2, is journaled in the vertical slide 16 and driven from a prime mover 207 which is carried by the horizontal slide 13. The motor drives through multiple V belts 208, the main shaft 209 of a variable speed gear box 210. This box consists of a plurality of shiftable gears whereby the output shaft 211 may be driven at a selective series of rates. The shaft 211 terminates in bevel gearing 212 by which it is connected to a vertical spline shaft 213 carried by the slide 13. The shaft 213 may be selectively connected in two different ratios to the spindle 206 as by means of the multiple belt high speed drive 214, or the low speed spur gear drive 215. Since this drive mechanism does not constitute any part of the present invention it will not be described in detail.

From the foregoing it will be apparent that the machine may be selectively set up in either one of two ways depending, of course, upon the nature of the pattern, and whether it is to be reproduced by profiling or by die-sinking methods, or by a combination of both. The machine is set up for profiling purposes by locking the control valve plunger 128 by means of the stop lever 132, which is operated by the manual control 132', located on the front of the machine, and the control valve 34 is positioned, as shown in Figure 9, to connect valve 74 for control of the rotary motor 68. When the pattern and work have been secured to the table of the machine, the operator rotates the hand wheel 98 to set the direction of feed, so that the tracer and cutter will approach the edge of the pattern and work. The feed rate control lever 107 is then moved to the desired feed rate, whereupon the tracer immediately becomes predeflected and the proper relative movement between the slides follows to cause engagement of the pattern with the work.

When this occurs, the operator throws the clutch 70 to thereby operatively connect the rotary motor 68 with the tracer head whereby the same will be automatically rotated to change the direction of feed in a line substantially parallel with the contour of the pattern.

During the profiling operation overdeflection or underdeflection of the tracer will automatically change the direction of feed in the manner previously explained. After the profiling operation has been completed, the operator disconnects the clutch 72 and rotates the hand wheel 98 in a direction to point the direction of feed away from the pattern so that the tracer and cutter will be separated from the pattern and work.

For die-sinking operations the stop lever 132 is disconnected from the control valve plunger 120 and the selector valve 84 is rotated clockwise, as viewed in Figure 9, so as to connect ports 134 and 135 with the rotary hydraulic motor 68. Assuming the tracer and cutter to be over the work, the release of valve 120 will cause a downward feeding movement until the tracer contacts the pattern. This downward feeding movement will stop when the tracer, by contact with the pattern, rotates the bell crank 126 and shifts the valve rod 120 into a position to equalize the total pressures in the opposite ends of cylinder 114. Feeding movement will then take place in accordance with the rotary setting of the tracer head which will remain constant, since the rotary motor 68 will not be rotated. The direction of feed will therefore be in a fixed vertical plane and the tracer and cutter will move up and down in that plane dependent upon the contour of the pattern. At the end of a given stroke across the work, the reversing valve 143 will be actuated either manually or automatically which will cause the rotary motor to rotate through an angle of 180°, since its rotation is limited by the mechanism shown in Figure 4. This will reverse the direction of feed so that a second scanning operation will be performed. By lifting up on the tracer at any time, the tracer and cutter may be withdrawn from contact with the pattern and work.

In accordance with the foregoing, there has been provided an improved automatic tracer controlled milling machine which may be selectively utilized for profiling or die-sinking purposes.

What is claimed is:

1. In a tracer mechanism for automatically controlling power movement between a tool and work piece, a tracer arm supported for universal movement about a point and relative to a fixed axis passing through said point, rate and direction control mechanism for governing said power movement having motion transmitting connections with said tracer arm whereby movement of the tracer arm into or out of coincidence with said axis will stop or start said power movement respectively, means for predeflecting the tracer arm to cause power feeding of the cutter into engagement with the work, the orientation of the plane determined by the tracer and said axis dictating the direction of said feeding movement, and means operable by the pattern for moving said tracer arm around said axis for varying the direction of said feeding movement in accordance with contour changes in the pattern.

2. In a tracer mechanism, the combination with a tracer arm supported for universal deflection with respect to a fixed axis, of means for determining the plane of tracer deflection, means to deflect the tracer in said plane, power operable means for effecting relative movement between a tool and work including rate control means therefor, motion transmitting connections coupling said rate control means for response to variations in the deflection of the tracer to vary the feed rate correspondingly, and adjustable means for determining the angle of said deflection.

3. A tracer mechanism for a pattern controlled machine tool having power operable means for effecting relative movement between a cutter and a work piece, comprising a wabble tracer having an axis of rotation inclined to its wabble axis, means for maintaining the wabble axis non-coincident with the axis of rotation, and means operable by a pattern for moving the tracer about its axis of rotation, while maintaining its angle of inclination thereto, for changing the direction of relative feeding movement between the cutter and work.

4. In a tracer controlled mechanism, the combination with power operable means for effecting a relative feeding movement between a cutter and work piece, and between a tracer and pattern, of a tracer arm having a neutral axis, means for deflecting the tracer arm with respect to said axis before it contacts the pattern, means responsive to deflection of the tracer to cause said power operable means to effect a feeding movement in a direction parallel to the plane determined by the deflected tracer and its neutral axis, and means responsive to rotation of the tracer by the pattern about its neutral axis for changing the direction of feeding movement.

5. In a pattern controlled machine tool having a cutter spindle and a tracer arm, the combination of means to support the parts in parallel relation, means for predeflecting the tracer into a non-parallel relation with respect to the cutter axis, whereby the pattern end of the tracer will contact a given point on the pattern before the cutter engages a corresponding point on the work, and means responsive to rotation of the deflected tracer by the pattern to vary the direction of feeding movement.

6. In a pattern controlled machine tool, a tracer head construction comprising a tracer arm supported for universal movement with respect to the tracer head, and resilient means in the tracer head for predeflecting the tracer arm before it contacts a pattern.

7. In a pattern controlled machine tool, the combination of a tracer head, a tracer arm supported therein and having an axis of rotation and an axis of deflection, means coupled to the tracer for controlling the feeding movement between a cutter and work piece, means to coaxialize said axes to stop the feeding movement, means to impart a variable angle of deflection to one of said axes relative to the other to cause variable rates of feeding movement, said deflecting means having a unidirectional thrust, power operable means for changing the orientation of the direction of thrust in a clockwise or counterclockwise direction and motion transmitting means operable by the tracer for controlling operation of said power operable means.

8. In a tracer mechanism for a pattern controlled machine tool, the combination of a tracer head having a deflectable tracer arm supported therein for movement into and out of coincidence with the axis of said head and in a circular path about said axis, motion transmitting means coupling the tracer for control of the feeding movement between a cutter and work piece, the orientation of the radial plane determined by the axes of the tracer and tracer head determining the direction of said feeding movement, means determining a secantial plane intersecting said circular path whereby when the tracer is at one side of said plane it will cause counterclockwise rotation of the tracer head and on the other side of said plane will cause clockwise rotation of the tracer head, and means effective when the axis of the tracer and said radial and secantial planes intersect in the same point for stopping said rotary movement and causing a linear feeding movement between the cutter and work.

9. In a tracer controlled mechanism, a tracer having a predetermined amount of deflection relative to an axis of revolution which intersects the axis of the tracer, means predetermining a neutral plane in spaced parallel relation to said axis of revolution, said means also acting to cause rotation of the tracer into engagement with the pattern whereby protuberances on the pattern will cause counterwise rotation of the tracer, and means responsive to the orientation of the plane of the tracer and the axis of revolution for determining the direction of relative feeding movement between a cutter and a work piece.

10. In a pattern controlled machine tool, a tracer head construction comprising a tracer arm supported for universal movement with respect to the tracer head, resilient means in the tracer head for predeflecting the tracer arm before it contacts a pattern, and means to variably limit the amount of said predeflection.

11. In a pattern controlled milling machine, the combination with a pair of slides movable along axes lying in intersecting planes, of fluid operable means for moving said slides, individual control valves for the respective fluid operable means and supported in the machine with their axes lying parallel to the axes of the slides which they control, a tracer arm supported by one of said slides with its axes passing through the point of intersection of the axes of said valves, and means intercoupling the tracer to said valves whereby the plane of deflection of the tracer will determine the plane of resultant movement between the tracer and the other slide.

12. In a pattern controlled machine tool, the combination with a pair of slides supported for movement in right angular relation, means for moving said slides including a piston and cylinder for each slide, one member of which is connected to the slide and the other to the support, individual valves for controlling the direction of resultant pressure in said cylinders and supported in parallel relation to the respective cylinders which they control, and a tracer supported at the intersection of the axes of said valves and operatively coupled thereto for controlling individual or simultaneous actuation thereof in accordance with the plane of deflection of the tracer.

13. In a pattern controlled machine tool having a tracer support and a pattern support, the combination of means for automatically controlling the direction of relative feeding movement between said supports including a pivotally supported tracer, artificial means for deflecting the tracer whereby the tracer point will move in a radial direction with respect to its undeflected axis, and means responsive to deflection of the tracer to cause a feeding movement in the opposite radial direction to that in which the tracer was deflected.

14. In a device of the class described, a pivotally supported tracer having an axis of deflection and an axis of rotation which intersect in the pivotal support for the tracer, resiliently operable means acting on one end of the tracer to cause predeflection thereof in a direction at an acute angle to the direction of feed whereby the return will tend to cause rotation of the tracer about its axis of rotation, and means deriving a motion component from said resiliently operable means, tending to resist said rotation and cause a continuous urge of the tracer into engagement with the pattern.

15. In a mechanism of the class described, the combination of a tracer pivotally supported for universal deflection, resiliently operable means having a directional component for causing deflection of the tracer in one direction, power operable means for causing rotation and thereby a change in the angle of said component to change the plane of deflection of the tracer, and a valve responsive to external actuation of the tracer in a manner to change the angle of its plane of deflection including a control valve and a fluid operable motor governed thereby for causing said rotation.

16. In a pattern controlled machine tool having a bed and a pair of slides mounted on said bed, of individual piston and cylinder motors for actuating each slide, one part of each motor being connected to the moving slide and the other to the support, a pump having its delivery port directly connected to one end of each cylinder, a pair of control valves connecting the delivery port of said pump in parallel to the other end of the respective cylinders, each of said valves having a reservoir connection, and means coupling said valves to a tracer for automatic control of the direction of relative movement between the slides.

17. In a pattern controlled machine tool having a work supporting slide and a cutter supporting slide, of a tracer supported by one of said slides for engagement with a pattern carried by the other slide, of power operable means for causing relative movement between the slides, means for predeflecting the tracer, and means responsive to predeflection of the tracer for causing relative movement between the supports, and means responsive to the direction of the deflected movement of the tracer for determining the direction of said relative movement.

18. In a pattern controlled machine tool having a work support and a cutter support, the combination of means for automatically controlling relative movement between the supports in accordance with the outline of a pattern carried by one of said supports, of a tracer supported by the other of said supports, a rotary tracer head having means thereon for causing deflection of the tracer, a motor for rotating said tracer head, means responsive to deflection of the tracer when out of contact with the pattern for causing actuation of said motor, and means to disconnect the motor from said tracer head whereby the tracer may be moved into engagement with the pattern without causing rotation of the head.

19. In a pattern controlled machine tool having a pair of relatively movable slides, the combination of power operable means for effecting said movement, a tracer for controlling energization of said power operable means including a pair of control valves arranged in right angular relationship and operatively connected to the tracer whereby the plane of deflection of the tracer will determine the direction of said relative movement, means to support the tracer for rotation about an axis angularly related to the axis of deflection, a rotatable tracer head having means therein for deflecting the tracer independent of said pattern, said means also acting on the tracer to maintain an urge component perpendicular to the surface of the pattern to maintain the tracer automatically into engagement with the pattern.

20. In a pattern controlled die-sinking machine having a work support and a tool support, one of which is movable toward and from the other, the combination of a tracer carried by one of said supports, power operable means for effecting a relative feeding movement between the supports, control means therefor having operative connections with the tracer whereby deflection of the tracer in a given plane will determine the direction of feeding movement, a valve responsive to axial movement of the tracer for controlling axial movement of the cutter, and means responsive to over-deflection of the tracer relative to a plane perpendicular to the direction of feed to actuate a holding means to prevent movement of the tracer in an axial direction when end pressure thereon is removed.

21. In a tracer mechanism for die-sinking purposes, the combination of a tracer, a support therefor, means to impart an axial urge on the tracer toward the pattern, means to support the tracer for deflection toward and from a plane perpendicular to the direction of feed, and means responsive to over-deflection of the tracer relative to said plane to prevent return axial movement of the tracer until the overdeflected condition is removed.

22. In a die-sinking machine, the combination of a work support, and a cutter support, means to support a tracer on the last-named support in perpendicular relation to the work support, resiliently operable means for urging the tracer toward the work support, said means also acting to predeflect the tracer, said tracer being supported for rotation about a perpendicular axis, while in a deflected condition, by an abrupt change in the contour of the pattern, resulting in an upward movement of the tracer, and means for holding the tracer in its axial position relative to its support during said upward movement and until the tracer has been reversely rotated to a normal operating condition.

ERWIN G. ROEHM.